United States Patent
Fuhs et al.

(10) Patent No.: US 12,240,455 B2
(45) Date of Patent: Mar. 4, 2025

(54) DYNAMIC REFERENCE GENERATION AND CONTROL FOR VEHICLES TRAVELING IN A CONVOY

(71) Applicant: Cummins Inc., Columbus, IN (US)

(72) Inventors: Karla Fuhs, Columbus, IN (US); Hoseinali Borhan, Bloomington, IN (US); Gayatri Adi, Columbus, IN (US); Bibin N. Pattel, Columbus, IN (US)

(73) Assignee: Cummins Inc., Columbus, IN (US)

( * ) Notice: Subject to any disclaimer, the term of this patent is extended or adjusted under 35 U.S.C. 154(b) by 227 days.

(21) Appl. No.: 18/049,381

(22) Filed: Oct. 25, 2022

(65) Prior Publication Data

US 2024/0132071 A1 Apr. 25, 2024
US 2024/0227803 A9 Jul. 11, 2024

(51) Int. Cl.
*B60W 30/165* (2020.01)
*B60W 10/18* (2012.01)
(Continued)

(52) U.S. Cl.
CPC .......... *B60W 30/165* (2013.01); *B60W 10/18* (2013.01); *B60W 20/14* (2016.01); *B60W 30/18127* (2013.01); *G05D 1/695* (2024.01); *G08G 1/22* (2013.01); *B60W 2510/244* (2013.01); *B60W 2510/246* (2013.01); *B60W 2556/45* (2020.02)

(58) Field of Classification Search
CPC .... B60W 30/165; B60W 20/14; B60W 10/18; B60W 30/18127; B60W 2556/45; B60W 2510/244; B60W 2510/246; G05D 1/695; G08G 1/22
See application file for complete search history.

(56) References Cited

U.S. PATENT DOCUMENTS 9,165,470 B2 * 10/2015 Mudalige ................. G08G 1/22
9,632,507 B1 4/2017 Korn
(Continued)

FOREIGN PATENT DOCUMENTS

WO 2019089699 5/2019
WO 2019126459 6/2019

*Primary Examiner* — Gertrude Arthur Jeanglaude
(74) *Attorney, Agent, or Firm* — Taft Stettinius & Hollister LLP (57) ABSTRACT

An electronic control system is configured to control a vehicle operating in a convoy by determining a vehicle motion reference parameter (VMRP) in response to a convoying control input (CCI), determining a braking capability of the vehicle including at least a regenerative braking capability, determining a minimum following distance between the vehicle and a forward vehicle of the convoy based at least in part upon the braking capability, and arbitrating among a plurality of control options including performing a first modification of the VMRP determined to provide operation of the vehicle satisfying the minimum following distance and controlling motion of the vehicle using the first modification of the VMRP, performing a second modification of the VMRP determined to provide improved operating efficiency of the vehicle controlling motion of the vehicle using the second modification of the VMRP, and performing no modification of the VMRP and controlling motion of the vehicle using the VMRP without modification.

24 Claims, 6 Drawing Sheets

(51) Int. Cl.
    *B60W 20/14*     (2016.01)
    *B60W 30/18*     (2012.01)
    *G05D 1/695*     (2024.01)
    *G08G 1/00*     (2006.01)

(56) References Cited

U.S. PATENT DOCUMENTS

| | | | |
|---|---|---|---|
| 9,721,474 B2 * | 8/2017 | Eskilson | B60W 40/08 |
| 10,252,721 B1 * | 4/2019 | Bai | B60Q 1/508 |
| 10,262,542 B2 * | 4/2019 | Brooks | G08G 1/22 |
| 10,328,802 B2 | 6/2019 | Gaither et al. | |
| 2016/0163200 A1 * | 6/2016 | He | G08G 1/22 |
| | | | 701/117 |
| 2021/0031817 A1 | 2/2021 | Books et al. | |
| 2021/0232157 A1 | 7/2021 | Dieckmann et al. | |

\* cited by examiner

DYNAMIC REFERENCE GENERATION AND CONTROL FOR VEHICLES TRAVELING IN A CONVOY

GOVERNMENT RIGHTS

This invention was made with Government support under DE-EE0008469 awarded by U.S. Department of Energy. The Government has certain rights in this invention.

TECHNICAL FIELD

The present disclosure relates to apparatuses, methods, systems, and techniques including dynamic reference generation and control for vehicles traveling in a convoy.

BACKGROUND

A vehicle convoy, such as a vehicle platoon, typically comprises a group of vehicles traveling in close proximity using RADAR, LIDAR, proximity sensor information, or camera information, and in some instances, inter-vehicle coordination facilitated by some form of direct or indirect (e.g., cloud-based) communication. Current proposals for controlling vehicles traveling in convoys, while recognizing some potential benefits, face a number of challenges and suffer from a number of drawbacks, limitations, and shortcomings including those respecting communication robustness, distribution of control authority and responsibility, fuel efficiency, and safety. These and other shortcomings of conventional approaches have limited the efficacy of conventional proposals for controlling vehicles traveling in convoys. There remain a number of significant needs for the unique apparatuses, methods, systems, and techniques disclosed herein.

DISCLOSURE OF ILLUSTRATIVE EMBODIMENTS

For the purposes of clearly, concisely, and exactly describing illustrative embodiments of the present disclosure, the manner and process of making and using the same, and to enable the practice, making and use of the same, reference will now be made to certain illustrative embodiments, including those illustrated in the figures, and specific language will be used to describe the same. It shall nevertheless be understood that no limitation of the scope of the invention is thereby created and that the invention includes and protects such alterations, modifications, and further applications of the illustrative embodiments as would occur to one skilled in the art.

SUMMARY OF THE DISCLOSURE

Illustrative embodiments include unique apparatuses, methods, systems, and techniques including dynamic reference generation and control for vehicles traveling in a convoy. Further embodiments, forms, objects, features, advantages, aspects, and benefits shall become apparent from the following description and drawings.

DETAILED DESCRIPTION OF ILLUSTRATIVE EMBODIMENTS

Figure 1:
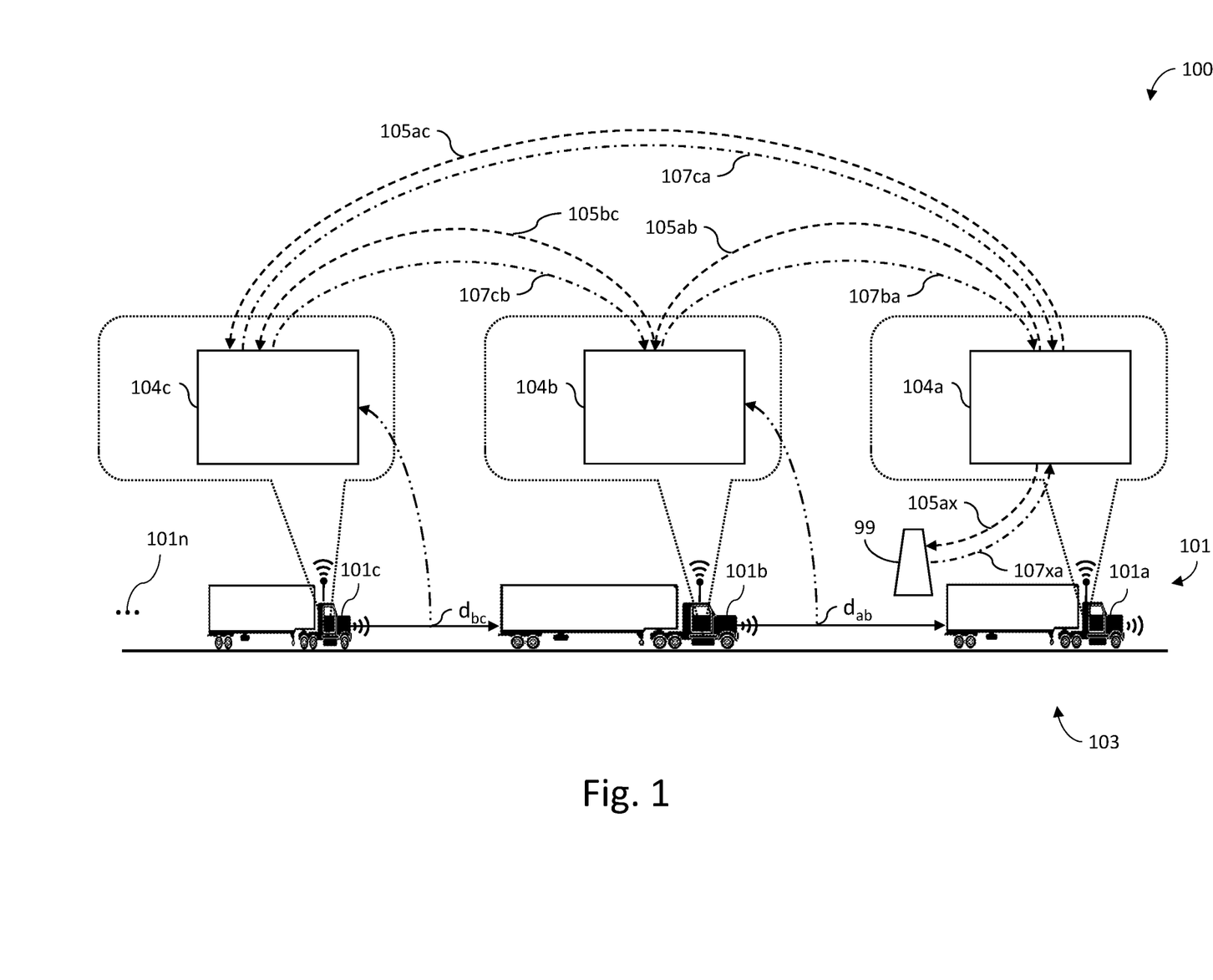
FIG. 1 is a schematic diagram illustrating certain aspects of an example vehicle platoon.

With reference to FIG. 1, there is illustrated a schematic view of an example vehicle convoy 103. In the illustrated example convoy 103 is depicted as operating in a platooning mode of operation in which the operation of vehicles 101 is controlled in a coordinated manner according to one or more operating objectives including, for example, operating efficiency (e.g., fuel consumption, fuel economy, or other energy consumption or efficiency objectives or metrics), travel time, operating costs, or combinations of the foregoing or other operating objectives. In other examples, convoy 103 may be configured and may operate in other types of convoying or convoy operation including, for example, multiple vehicles traveling in a cohort with one or more of the vehicles operating with adaptive cruise control (ACC), cooperative adaptive cruise control (CACC), or predictive adaptive cruise control (PACC). The convoy may also include one or more vehicles that are self-driving.

Each of vehicles 101 may be any of a variety of types of vehicles such as trucks, tractor-trailers, box trucks, buses, and passenger cars, among others. In the illustrated example, vehicles 101 are depicted as tractor-trailers, but other types of vehicles, such as the foregoing, are contemplated herein. Vehicles 101 may each be the same or similar types of vehicles, for example, in the case of a commonly managed vehicle fleet, or may be a heterogeneous group or set of vehicles which may comprise different types or classes of vehicles, for example, semi tractor-trailers and passenger cars. For example, vehicles 101 may be of the same type (e.g., class, platform, or model) and configuration, of the same type with different configurations (e.g., different powertrains or powertrain components, or different powertrain configurations or settings), or of different types and different configurations. Regardless of the similarity of or differences between vehicles 101, the cargo load of vehicles 101 may vary among vehicles 101 at a given time and for each of vehicles 101 and among vehicles 101 over time.

Each vehicle 101 includes a prime mover system which may be provided and configured as an internal combustion engine system, a battery-electric motor system, a hybrid system including an internal combustion engine and a battery-electric motor system, or a fuel cell-electric system, structured to output power to propel the vehicle 101. Some embodiments contemplate that prime movers of the plurality of vehicles 101 may be the same or similar types of prime movers, for example, in the case of a commonly managed vehicle fleet. Some embodiments contemplate that prime movers may comprise different types or classes of prime movers, for example, prime movers of different sizes, powers or types (e.g., diesel engine powertrains, gasoline engine powertrains, natural gas powertrains, hydrogen combustion powertrains, hybrid-electric powertrains, and electric powertrains). For convenience of description prime mover may be referred to herein as an engine, however, it shall be understood that references to an engine are not limited to an internal combustion engine and instead also apply to and include other types of prime movers such as the foregoing and other examples disclosed herein.

Each vehicle 101 utilizes one or more environmental sensors to determine its positioning relative to other vehicles in vehicle convoy 103. Examples of the types of sensor systems that may be utilized include RADAR systems, LIDAR systems, proximity sensor systems, camera systems, and combinations of these and/or other sensor systems. Each vehicle 101 in vehicle convoy 103 also includes a wireless communication system allowing vehicle-to-vehicle (V2V) communication or vehicle-to-X (V2X) communication where X denotes a variety of possible types of external networks including, for example, networks associated with stationary infrastructure assets.

Each vehicle 101 includes an electronic control system (ECS) (e.g., ECS 104a of vehicle 101a, ECS 104b of vehicle 101b, and ECS 104c of vehicle 101c) which is structured to control and monitor operation of its respective vehicle 101, as well as to participate in one or more of the coordinated operation as disclosed herein. An example ECS comprises one or more integrated circuit-based electronic control units (ECU) or other control components which may be operatively coupled to one another over a communication bus or network such as a controller area network (CAN) and which are structure to implement various controls, for example, an engine ECU structured to control and monitor operation of an engine and engine accessories, a transmission ECU structured to control and monitor operation of a transmission, a wireless communication ECU structured to control ex-vehicle wireless communications, and one or more environmental sensor ECUs structured to control operation of an environmental sensor system may be provided. It shall be appreciated that the control logic and control processes disclosed herein may be performed by controllers or controls which are implemented in dedicated control components of the ECS (e.g., in a dedicated ECU or other dedicated control circuitry) or may be implemented in a distributed fashion across multiple control components of ECS (e.g., through coordinated operation of an engine ECU, a transmission ECU, a wireless communication ECU and an environmental sensor ECU).

The ECUs and other control components of the ECS may comprise digital circuitry, analog circuitry, or hybrid combinations of both of these types. The ECUs and other control components of the ECS can be programmable, an integrated state machine, or a hybrid combination thereof. The ECUs and other control components of the ECS can include one or more Arithmetic Logic Units (ALUs), Central Processing Units (CPUs), memories, limiters, conditioners, filters, format converters, or the like which are not shown to preserve clarity. In one form, the ECS is of a programmable variety that executes algorithms and processes data in accordance with operating logic that is defined by executable program instructions stored in a non-transitory memory medium (e.g., software or firmware). Alternatively or additionally, operating logic for the ECS can be at least partially defined by hardwired logic or other hardware.

It shall be appreciated that electronic control systems and components thereof disclosed herein may be configured to determine or obtain a parameter, quantity, value or other operand based upon another parameter, quantity, value or other operand in a number of manners including, for example, by calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof. Likewise the disclosed acts of determination or determining or obtaining a parameter, quantity, value or other operand based upon another parameter, quantity, value or other operand may comprise a number of acts including, for example, acts of calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof.

The environmental sensor and wireless communication capabilities of vehicles 101 allow their operation to be coordinated using direct or indirect communication. For example, vehicles 101 may accelerate or brake simultaneously, or in a coordinated sequence, maintain a particular distance relative to one another, or maintain a particular offset relative to one another. The offset may be, for example, an inter-vehicle distance, a time-gap between vehicles, a relative velocity between vehicles, or various other offset parameters. Coordinated operation also allows a closer following distance between vehicles by compensating for or eliminating distance needed for human reaction. Coordinate operation of vehicle convoy 103 further allows for operation that reduces net fuel consumption or increases net efficiency of the vehicle convoy 103. In some embodiments, one or more of the vehicles 101 may be equipped with aerodynamic capability (wind assist panels on cab & trailer, aerodynamic tractor body) that creates a laminar flow of air (tunnel effect) that greatly reduces air drag. Other vehicles among vehicles 101 may be spaced close enough to the vehicle taking advantage of a wind break tunnel to increase fuel economy. It shall be appreciated that the controls disclosed herein can mitigate aerodynamic losses both by adjusting vehicle following distance(s) and vehicle offset.

The respective ECS of each of vehicles 100 is configured and operable to send and receive inter-vehicle transmissions in a bi-directional manner. In the illustrated example, ECS 104a of vehicle 101a sends a transmission 105ab which is received by ECS 104b of vehicle 101b, and ECS 104b of vehicle 101b sends a transmission 107ba which is received by ECS 104a of vehicle 101a. In the illustrated example, ECS 104b of vehicle 101a sends a transmission 105bc which is received by ECS 104c of vehicle 101c, and ECS 104c of vehicle 101c sends a transmission 107cb which is received by ECS 104b of vehicle 101b. In the illustrated example, ECS 104a of vehicle 101a sends a transmission 105ac which is received by ECS 104c of vehicle 101c, and ECS 104c of vehicle 101c sends a transmission 107ca which is received by ECS 104a of vehicle 101a. Similar bi-directional communication may occur relative to one or more other vehicles 101n of convoy 103. In the illustrated example, each of vehicles 101 is in bi-directional communication with its respective immediately forward vehicle (if present, e.g., in the case of a non-lead vehicle) and its respective immediately rearward vehicle (if present, e.g., in the case of a non-caboose vehicle). It is also contemplated that one or more of vehicles 101 may be in bi-directional communication with other forward vehicles (if present) and other rearward vehicles (if present).

The respective ECS of each of vehicles 100 is configured and operable to send and receive vehicle to anything (V2X) transmissions, such as vehicle to infrastructure transmissions in a bi-directional manner. In the illustrated example, ECS 104a of vehicle 101a sends a transmission 105ax which is received by infrastructure communication system 99, and infrastructure communication system 99 sends a transmission 107xa which is received by EC S 104a of vehicle 101a. While not depicted in the illustrated example, ECS 104a of vehicle 101a may send and receive V2X transmissions to various other infrastructure communication systems. Likewise, while not depicted in the illustrated example, ECS 104b of vehicle 101b and ECS 104c of vehicle 101c may send and receive V2X transmissions to and from infrastructure communication system 99 and various other infrastructure communication systems.

Figure 2:
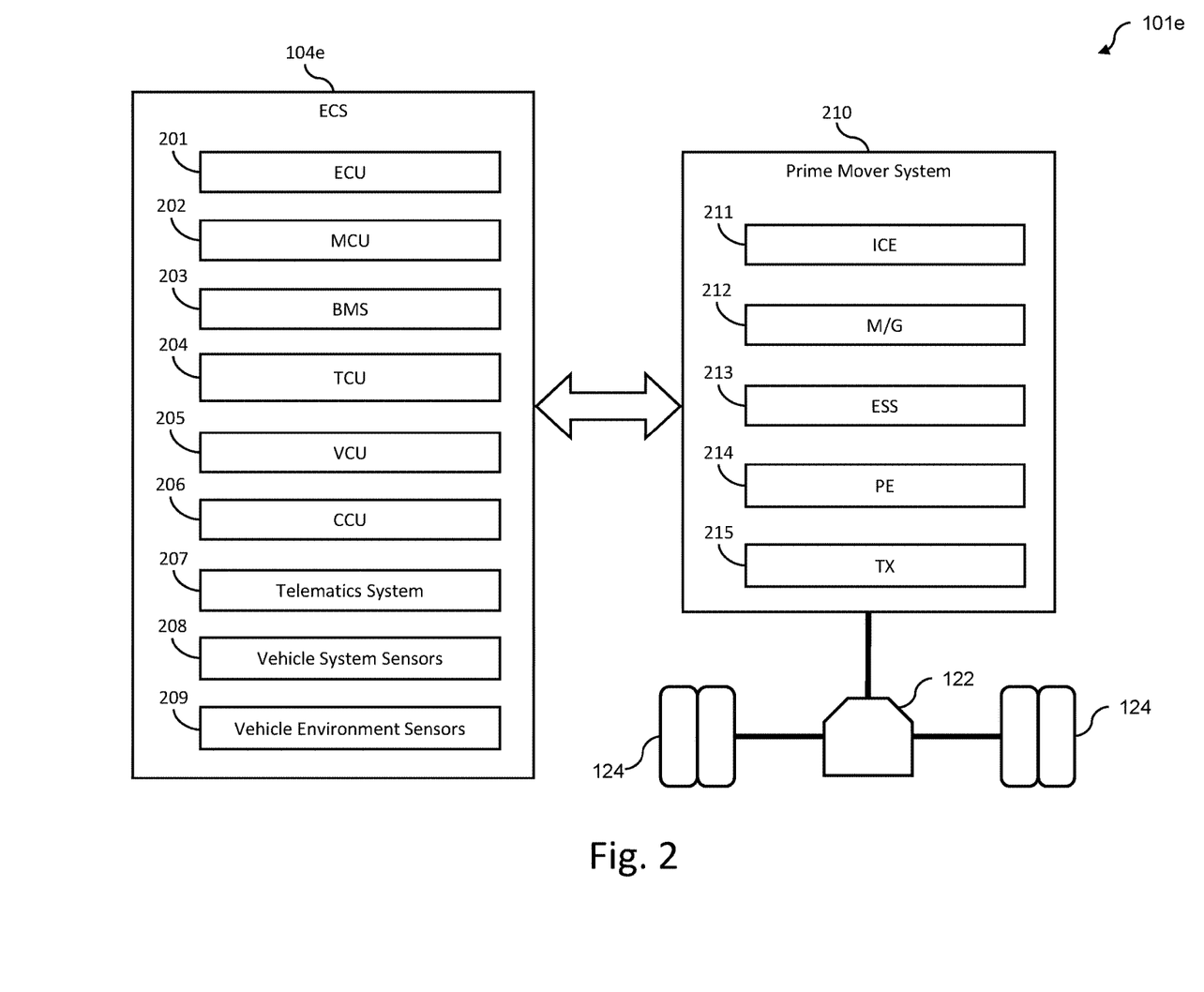
FIG. 2 is a schematic diagram illustrating certain aspects of an example vehicle configured for convoying operation.

With reference to FIG. 2, there is illustrated an example vehicle system 101e (also referred to herein as system 101e and vehicle 101e) according to one example embodiment. System 101e is one example of a vehicle configuration that may be provided in any one or more of vehicles, 101a, 101b, 101c, 101n of vehicle convoy 103. Furthermore, system 101e includes an ECS 104e which is one example of an electronic control system configuration that may be provided in any one or more of vehicles, 101a, 101b, 101c, 101n of vehicle convoy 103. It shall be appreciated that in other embodiments, and forms, system 101e and ECS 104e may include additional or alternative features including, for example, the alternatives, options, and variations disclosed elsewhere herein.

System 101e includes a prime mover system 210 and an electronic control system (ECS) 104e which are operatively coupled and in operative communication with one another. In the illustrated example, prime mover system 210 is provided and configured as a hybrid system including an internal combustion engine system (ICE) 211, a motor/generator system (M/G) 212 configured for vehicle propulsion or traction, an energy storage system (ESS) 213, a power electronics system (PE) 214 which may be associated with or provided as a part of M/G 212 and/or ESS 213, and a transmission system (TX) 215. In other embodiments, the prime mover system 210 may be provided and configured in different forms and types such as the forms and types described elsewhere herein. In the illustrated example, prime mover system 210 operatively coupled with and configured to output torque to drive wheels 124 via a differential 122 to move the vehicle. In other embodiments, prime mover system may be configured in other manners and operatively coupled with wheels, other ground contacting members, or other vehicle propulsion members to move the vehicle.

ECS 104e comprises control circuitry configured to control a number of operational aspects of prime mover system 210 as well as other operational aspects of system 101e. The control circuitry of ECS 104e may be provided in a number of forms and combinations. In some embodiments, the control circuitry of ECS 104e may be provided in whole or in part by one or more microprocessors, microcontrollers, other integrated circuits, or combinations thereof which are configured to execute instructions stored in a non-transitory memory medium, for example, in the form of stored firmware and/or stored software. It shall be appreciated that microprocessor, microcontroller and other integrated circuit implementations of the control circuitry disclosed herein may comprise multiple instances of control circuitry which utilize common physical circuit elements. For example, first control circuitry may be provided by a combination of certain processor circuitry and first memory circuitry, and second control circuitry may be provided by a combination of, at least in part, that certain processor circuitry and second memory circuitry differing from the first memory circuitry.

It shall be further appreciated that the control circuitry of ECS 104e may additionally or alternatively comprise other digital circuitry, analog circuitry, hybrid analog-digital circuitry, or combinations thereof. Some non-limiting example elements of such circuitry include application specific integrated circuits (ASICs), arithmetic logic units (ALUs), amplifiers, analog calculating machine(s), analog to digital (A/D) and digital to analog (D/A) converters, clocks, communication ports, field programmable gate arrays (FPGAs), filters, format converters, modulators or demodulators, multiplexers, and de-multiplexers, non-transitory memory devices and media, oscillators, processors, processor cores, signal conditioners, state machine(s), and timers. As with microprocessor, microcontroller, and other integrated circuit implementations, such alternate or additional implementations may implement or utilize multiple instances of control circuitry which utilize common physical circuit elements. For example, first control circuitry may be provided by a combination of first control circuitry elements and second control circuitry elements, and second control circuitry may be provided by a combination of the first control circuitry elements and third control circuitry elements differing from the first control circuitry elements.

ECS 104e may in principle be provided as a single component or physical unit or a collection of operatively coupled components or physical units. In a number of embodiment, ECS 104e may be a multi-component or multi-unit form. When of a multi-component or multi-unit form, ECS 104e may have one or more components remotely located relative to the others in a distributed arrangement and may distribute the control function across one or more control units or devices.

In the illustrated example, ECS 104e is provided in a multi-component or multi-unit form including multiple electronic control units. ECS 104e includes engine control unit (ECU) 201 which is configured and operable to control aspects of at least ICE 211 and may also be configured and operable to control or influence operation of other systems of vehicle 101e. In the illustrated example, ECU 201 is depicted as a singular unit, it being appreciated that ECU 201 may comprise multiple units in some embodiments.

ECS 104e includes motor/generator control unit (MCU) 202 which is configured and operable to control aspects of at least M/G 212, may also be operable to control aspects of PE 214, and may also be configured and operable to control or influence operation of other systems of vehicle 101e. In the illustrated example, MCU 202 is depicted as a singular unit, it being appreciated that MCU 202 may comprise multiple units in some embodiments.

ECS 104e includes battery management system (BMS) 203 which is configured and operable to control aspects of at least ESS 213, may also be operable to control aspects of PE 214, and may also be configured and operable to control or influence operation of other systems of vehicle 101e. In the illustrated example, BMS 203 is depicted as a singular unit, it being appreciated that BMS 203 may comprise multiple units in some embodiments.

ECS 104e includes transmission control unit (TCU) 204 which is configured and operable to control aspects of at least TX 215 and may also be configured and operable to control or influence operation of other systems of vehicle 101e. In the illustrated example, TCU 204 is depicted as a singular unit, it being appreciated that TCU 204 may comprise multiple units in some embodiments.

ECS 104e includes vehicle control unit (VCU) 205 which is configured and operable to control additional aspects of vehicle 101e including aspects not directly relating ICE 211, M/G 212, ESS 213, PE 214, or TX 215, but may also be configured and operable to control or influence operation the foregoing or other systems of vehicle 101e. In the illustrated example, VCU 205 is depicted as a singular unit, it being appreciated that VCU 205 may comprise multiple units in some embodiments.

ECS 104e includes convoy control unit (CCU) 206 which is configured and operable to control aspects of convoying operation of vehicle 101e and may also be configured and operable to control or influence operation of other systems of vehicle 101e. In the illustrated example, CCU 206 is depicted as a singular unit, it being appreciated that CCU 206 may comprise multiple units in some embodiments.

ECS 104e includes a telematics system 207 which may include one or more telematics components or systems such as a global positioning system (GPS) system, one or more communication systems adapted for communication with systems external to the vehicle such as a vehicle-to-vehicle (V2V), vehicle-to-everything (V2X) or vehicle to satellite (V2S) communication system, and/or one or more other types of telematics components or systems. Telematics system 207 may be configured to support various types of communication including, for example, dedicated short range communications (DSRC), and 5G and other cellular network standards, as well other types of communications.

ECS 104e includes vehicle system sensors 208 which include a plurality of sensor configured to sense operating conditions of prime mover system 210 or constituent systems thereof including ICE 211, M/G 212, ESS 213, PE 214, TX 215, or other systems of vehicle 101e. Vehicle system sensors 208 may include one or more temperature sensors configured to sense conditions of or associated with ICE 211, M/G 212, ESS 213, PE 214, TX 215, or other components or systems of prime mover system 210 or vehicle 101e.

ECS 104e includes vehicle environment sensors 209, also referred to as environment-to-vehicle (E2V) sensors, which include a plurality of sensor configured to sense conditions of or associated with the environment external to the vehicle. Vehicle environment sensors 209 may include, for example, RADAR devices or systems, LIDAR devices or systems, proximity sensor devices or systems, or camera and image processing devices or systems, or combinations thereof.

The illustrated components and systems of ECS 104e, as well as other components and systems of ECS 104e are configured to operatively communicate with one another either directly or via one or more networks such as one or more controller area networks (CANs) and may also be configured to communicate with various systems, devices, and sensors of system 101e via dedicated communication links of via one or more CANs.

Figure 3:
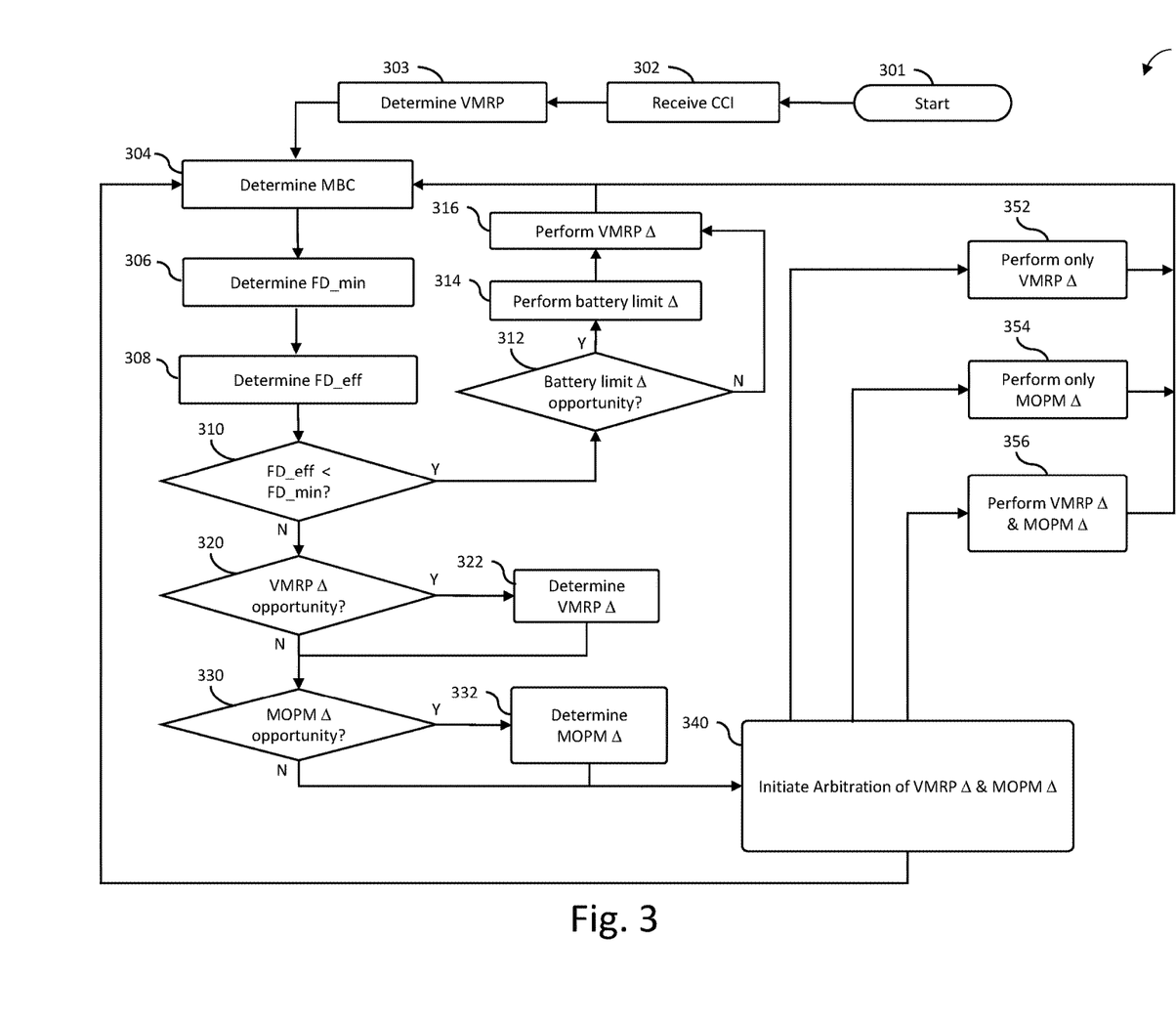
FIG. 3 is a flow diagram illustrating certain aspects of an example control process for a vehicle in a vehicle convoy.

With reference to FIG. 3 there are illustrated certain aspects of an example process 300 suitable for controlling a vehicle in a convoy of vehicles. Process 300 may be implemented and performed in connection with one or more components of an electronic control system of a vehicle such as ECS 104e of vehicle 101e or another electronic control system. In describing process 300 references to "an ECS" or "the ECS" shall be understood to be applicable, implementable in connection with, and performed by any suitable electronic control system of a vehicle including, ECS 104a, ECS 104b, ECS 104c, ECS 104e, and/or other electronic control systems. Likewise in describing process 300 references to a component of system of an ECS shall be understood to be applicable, and to refer to the components and systems described in connection with ECS 104a, ECS 104b, ECS 104c, and ECS 104e, as well as to components and/or other electronic control systems Process 300 begins at start operation 301 and proceeds to operation 302 at which an ECS receives a convoying control input (CCI). The CCI may be of a number of forms. In some embodiments, the CCI may comprise an input received from a telematics system such as telematics system 207 or component thereof. In some forms of such embodiments, the CCI may comprise, or may be determined at least in part based upon one or more inputs received via a vehicle communication systems such as a V2V communication system, V2X communication system, V2S communication system, and/or one or more other types of telematics components or systems. Such inputs may include, for example, vehicle motion requests determined by a cohort control component external to the vehicle (e.g., a cohort control component of another vehicle of the cohort or of other external devices). The vehicle motion request may comprise, for example, a request for vehicle velocity, acceleration, and/or position (e.g., following distance).

In some embodiments, the CCI may comprise an input received from one or more vehicle environment sensors such as vehicle environment sensors 209. In some forms of such embodiments, the CCI may comprise, or may be determined at least in part based upon one or more inputs of RADAR devices or systems, LIDAR devices or systems, proximity sensor devices or systems, or camera and image processing devices or systems, or combinations thereof. Such inputs may include, for example, signals indicating a following distance between the vehicle and forward vehicle of the convoy in which the vehicle is traveling, a velocity of the forward vehicle, and/or an acceleration of the forward vehicle.

From operation 302, process 300 proceeds to operation 303. Operation 303 determines a vehicle motion reference parameter (VMRP) based at least in part upon the CCI received at operation 302. In some embodiments, the CCI may include an actionable or useable parameter and the VMRP may be determined by storing the CCI in memory as a predetermined reference parameter. In such embodiments, the CCI may include a requested vehicle following distance, velocity, acceleration, or other determinate, actionable request for vehicle motion.

In some embodiments, the CCI may include a parameter which may not be itself directly determinate or actionable and is processed to determine the VMRP. In some such embodiments, the CCI may include a request to decrease or increase a convoy following distance without specifying a particular following distance which request is processed to a determine an adjustment to a following distance reference parameter utilized in controlling operation of the vehicle. In some embodiments, the CCI may include a request for an increase or decrease in velocity or an acceleration or deceleration of a vehicle without specifying a particular velocity or acceleration which request is processed to determine an adjustment to a vehicle speed reference parameter utilized in controlling operation of the vehicle.

From operation 303, process 300 proceeds to operation 304. It shall be appreciated that operations 302 and 303 may thereafter repeat in response to receipt of new or updated CCI and, in the event of such repetition, may operate to update the VMRP provided to or used by operation 304 or subsequent operations.

Operation 304 determines a multipart braking capability (MBC) of the vehicle. Operation 304 may determine the MBC in a number of manners. In some embodiments, operation 304 may determine the MBC as a two term parameter including a first tem indicating a net braking capability of the vehicle (for example a determined coefficient of friction taking into account a number of factors including vehicle mass, tire type, tire condition, road surface condition) and a fraction or percentage of the net braking that can be provided by regenerative braking using a motor/generator to provide power to a battery.

Figure 4:
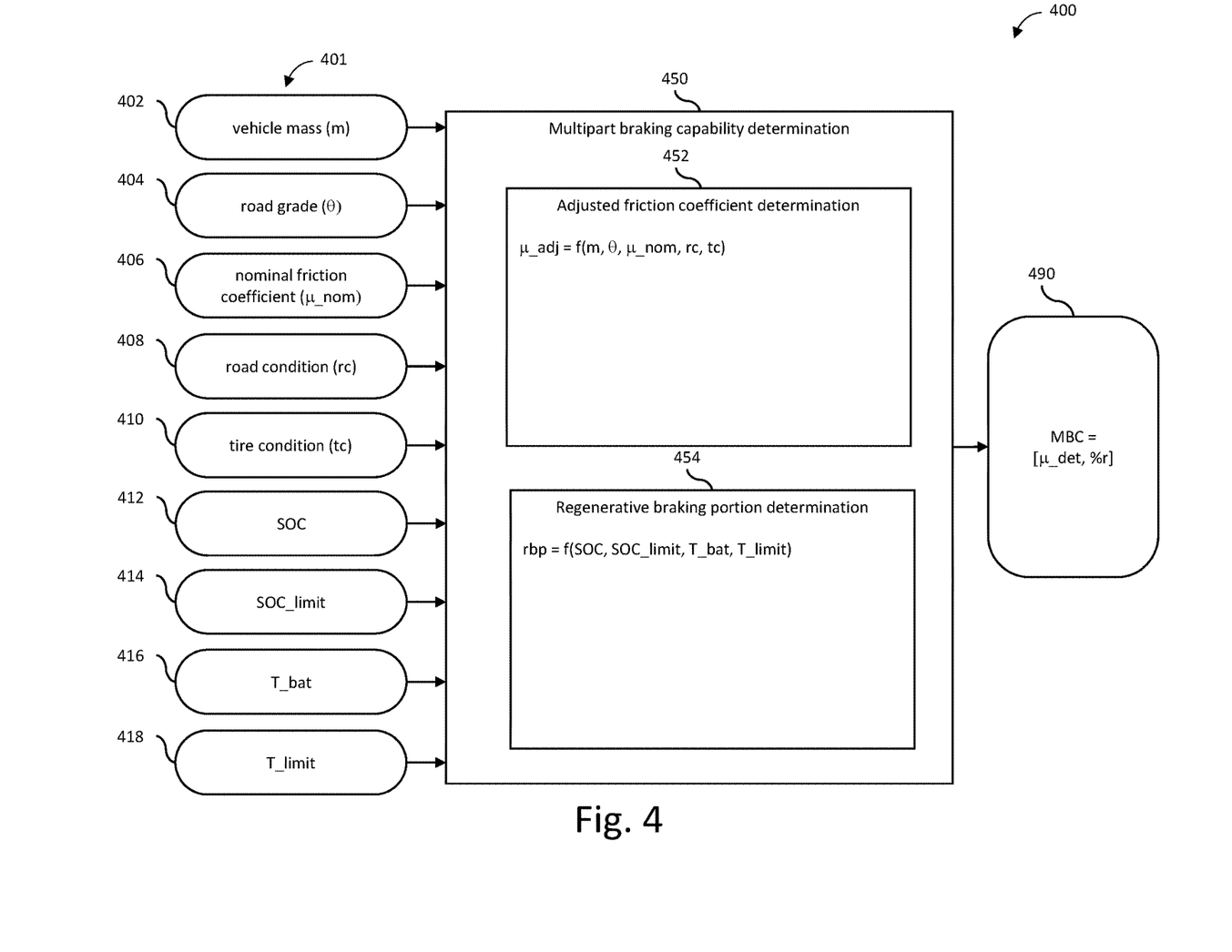
FIG. 4 is a schematic diagram illustrating certain aspects of example controls for a vehicle in a vehicle convoy.

FIG. 4 illustrates certain aspects of example controls 400 which may be utilized by operation 304 in determining an MBC. Controls 400 include a multipart braking capability determination logic 450 which receives a plurality of inputs 401 including vehicle mass (m) 402, road grade (θ) 404, nominal friction coefficient (μ_nom) 406, road condition (rc) 408, tire condition (tc) 410, battery state of charge (SOC) 412, battery SOC limit 414, battery temperature (T_bat) 416, and battery temperature limit (T_limit) 418.

Vehicle mass (m) 402 comprises at parameter indicative of the mass of the vehicle. The parameter may be a predetermined value or may be dynamically determined by evaluating responses of the vehicle to prime mover torque output or braking operations.

Road grade (θ) 404 comprises one or more parameters indicative of one or both of current road grade and forward road grade. A parameter indicative of current road grade may be determined by an inclinometer or other on-vehicle sensor or by reference to a current vehicle location and a map stored in a non-transitory computer-readable memory medium indicating road grades at a plurality of potential vehicle locations. A parameter indicative of future road grade may be determined by a look-ahead system using a predicted future vehicle location and a map stored in a non-transitory computer-readable memory medium indicating road grades at a plurality of potential vehicle locations.

Nominal friction coefficient (μ_nom) 406 includes a parameter indicating a nominal coefficient of friction between the tires of the vehicle and the road surface. The parameter may be predetermined based upon specifications of the vehicle and the tires and assumed road conditions or may be dynamically estimated based on evaluations of responses of the vehicle to prime mover torque output or braking operations.

Road condition (rc) 408 includes one or more parameters indicating a road condition, for example, dry, wet, icy. The parameters may be determined in response to one of more on-vehicle sensors configured or adapted to sense conditions of the ambient environment including, ambient temperature sensors, ambient humidity sensor, road surface sensors such as optical or other types of road surface sensors. The parameters may additionally or alternatively be determined in response to information communicated from a source external to the vehicle and received via a telematics systems or a component thereof, for example, current weather conditions or weather forecast information.

Tire condition (tc) 410 includes one or more parameters indicating a tire wear condition. The parameters may be determined in response to mileage, braking events, or other metrics correlated with tire ward.

Battery state of charge (SOC) 412 includes a parameter indicative of a current battery state of charge. The parameter may be determined by an on-vehicle system such as BMS 203 or another battery management system. Battery SOC limit 414 includes a parameter establishing a limit on battery state of charge.

Battery temperature (Tbat) 416 includes a parameter indicative of a current battery temperature. The parameter may be determined by an on-vehicle system such as BMS 203 or another battery management system and may utilized one or more temperature sensors provide in or associated with a battery of the vehicle. Battery temperature limit (T_limit) 418 a parameter establishing a limit on battery temperature.

Multipart braking capability determination logic 450 includes adjusted friction coefficient determination block 452 which is configured to determine an adjusted friction coefficient (μ_adj) in response to one or more of vehicle mass (m) 402, road grade (θ) 404, nominal friction coefficient (μ_nom) 406, road condition (rc) 408, tire condition (tc) 410. It shall be appreciated that the foregoing parameters may be used to adjust or scale (increase or decrease) a nominal friction coefficient (μ_nom) 406 based on a predetermined or modeled relationship with or response to variation in any one or more of vehicle mass (m) 402, road grade (0) 404, road condition (rc) 408, tire condition (tc) 410.

Multipart braking capability determination logic 450 includes regenerative braking determination block 454 which is configured to determine a proportion of a total braking capability that can be provided in response to battery state of charge (SOC) 412, battery SOC limit 414, battery temperature (T_bat) 416, and battery temperature limit (T_limit) 418. Regenerative braking determination block 454 may determine an amount of energy that can be converted and stored based on the SOC 412 and the SOC limit 414 and may compare that energy to the total energy required for braking the vehicle. Regenerative braking portion determination block 454 may additionally or alternatively determine an amount of energy that can be converted and stored based on the T_bat 416 and the T_limit 418 and may compare that energy to the total energy required for braking the vehicle.

From operation 304, process 300 proceeds to operation 306. Operation 306 determines a minimum following distance (FD_min) for the vehicle in response to the MBC determined at operation 304. Operation 306 may determine a minimum following distance in a number of manners. In some embodiments, operation 306 may determine the minimum following distance (FD_min) by determining a following distance at which a predicted stopping distance of the vehicle is greater than a reference distance. The predicted stopping distance of the vehicle determined may be determined based on the MBC and current vehicle velocity. As one example, the predicted stopping distance may be determined in in accordance with the equation: $d=v^2/2g(\mu+G)$, where d is the stopping distance, v is the current velocity of the vehicle, g is the gravitational acceleration constant, μ is the coefficient of friction between the tires and the road which may be given by or determined from the MBC, and G is road grade expressed as a percentage, or the equation $d=v^2/2g(\mu \cos \theta - \sin \theta)$, where d is the stopping distance, v is the current velocity of the vehicle, g is the gravitational acceleration constant, μ is the coefficient of friction between the tires and the road which may be given by or determined from the MBC, and θ is road grade angle.

The reference distance may be determined as the stopping distance of a forward vehicle traveling in front of the vehicle. The stopping distance of the forward vehicle may be determined in a number of manners. In some embodiments, the stopping distance of the forward vehicle may comprise an assumed, estimated, or nominal stopping distance. In some embodiments, the stopping distance of the forward vehicle may comprise a communicated stopping distance originating external to the vehicle (e.g., a stopping distance determined and communicated by the forward vehicle).

From operation 306, process 300 proceeds to operation 308. Operation 308 determines an effect of the VMRP on the following distance between the vehicle and a forward vehicle (FD_eff) which may be a predicted effect based on a determination of vehicle dynamics and dynamics of a forward vehicle.

From operation 308, process 300 proceeds to conditional 310. Conditional 310 evaluates whether the effect of the VMRP on the following distance between the vehicle and a forward vehicle (FD_eff) is less than the minimum following distance (FD_min). If conditional 310 evaluates affirmative, process 300 proceeds to conditional 312. If conditional 310 evaluates negative, process 300 proceeds to conditional 320.

Conditional 312 evaluates whether an opportunity to change a battery limit (battery limit Δ opportunity) is available. The battery limit may be a battery state of charge limit, a battery temperature limit, another limit on a battery or other energy storage system component of the vehicle, or a combination of two or more of the foregoing or other battery limits.

Figure 5:
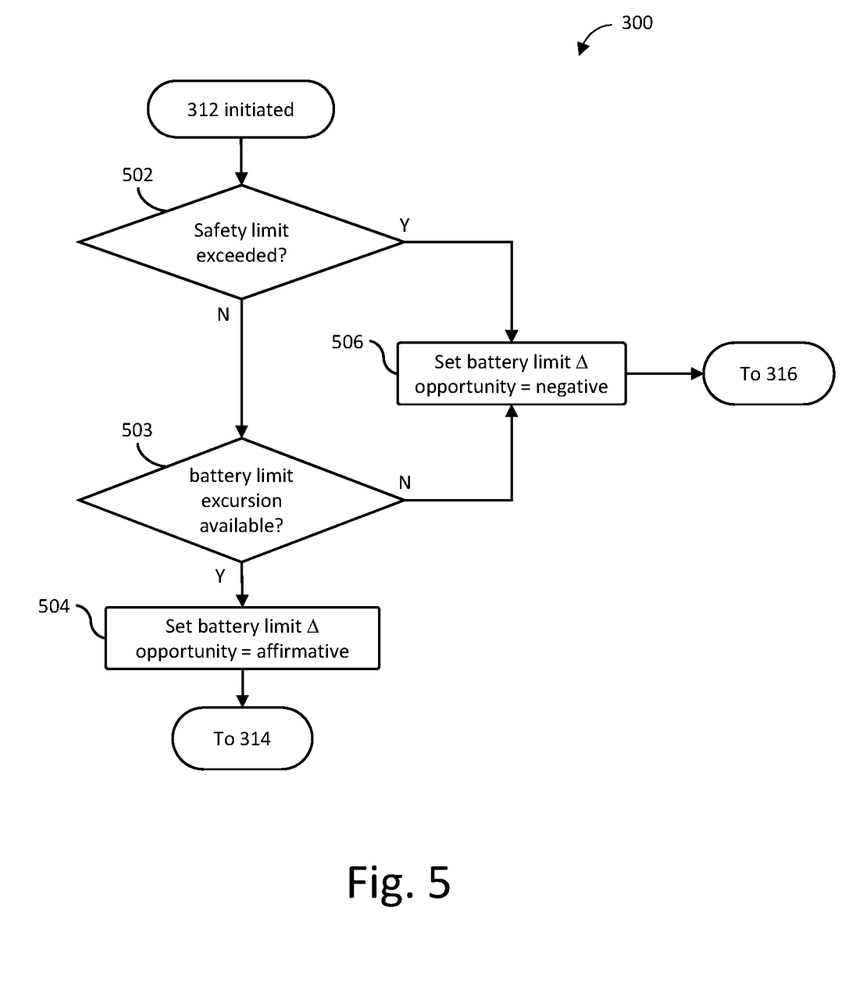
FIG. 5 is a flow diagram illustrating certain aspects of an example control process for a vehicle in a vehicle convoy.

As illustrated in FIG. 5, once initiated, conditional 312 may perform a process which at conditional 502 evaluates whether a safety limit has been exceeded. The safety limit may be configured and provided as a limit on the amount or degree to which the following distance between the vehicle and a forward vehicle (FD_eff) can exceed minimum following distance (FD_min). If conditional 502 evaluates affirmative, the process of proceeds to operation 506 which sets a battery limit change opportunity to negative.

If conditional 502 evaluates negative, the process proceeds to conditional 503 which evaluates whether a battery limit excursion is available. The evaluation may include evaluating a tolerance defined for the battery limit, a predicted duration or magnitude of limit excursion, a state of health of the battery, or other diagnostic criterion for the battery. If conditional 503 evaluates negative, the process proceeds to operation 506. If conditional 503 evaluates affirmative, the process proceeds to operation 504 which sets a battery limit change opportunity to affirmative.

If conditional 312 evaluates negative, process 300 proceeds to operation 316 which performs a modification of the VMRP (e.g., a decrease in vehicle velocity or acceleration specified by or determined in response to the VMRP or an increase in following distance specified by or determined in response to the VMRP). The modification of the VMRP may be determined or estimated to provide an increased following distance greater than the minimum following distance (FD_min). From operation 316, process 300 proceeds to operation 304 and proceeds as described above.

If conditional 312 evaluates affirmative, process 300 proceeds to operation 314 which performs a modification of the battery limit (e.g., an increase in a battery temperature limit or an increase in a battery state of charge (SOC) limit). The modification of the battery limit may be determined to provide a greater proportion of the required vehicle braking by regenerative braking. From operation 314, process 300 proceeds to operation 316 and proceeds as described above.

Conditional 320 evaluates whether a VMRP modification (VMRP Δ) opportunity is available. The evaluation may include determining whether the current following distance is sufficiently greater than the minimum following distance (FD_min) that a decrease if the current following distance is permissible and determining a modification of the VMRP to decrease the current following distance. If conditional 320 evaluates negative, process 300 proceeds to conditional 330.

If conditional 320 evaluates affirmative, process 300 proceeds to operation 322 which determines a modification of the VMRP (e.g., an increase in vehicle velocity or acceleration specified by or determined in response to the VMRP or a decrease in following distance specified by or determined in response to the VMRP). From operation 322, process 300 proceeds to conditional 330.

Conditional 330 evaluates whether a machine operating parameter (MOPM) modification opportunity is available. The MOPM may include modification of one or more prime mover systems or components. In some embodiments, evaluating the MOPM may include evaluating whether an opportunity for cylinder deactivation (CDA) is available, for example, whether a torque or power demand can be satisfied using CDA operation. In some embodiments, evaluating the MOPM may include evaluating whether an opportunity for changing the power split between an ICE and an M/G is available.

If conditional 330 evaluates negative, process 300 proceeds to operation 340. If conditional 330 evaluates affirmative, process 300 proceeds to operation 332 which determines a machine operating parameter modification (MOPM Δ). From operation 332, process 300 proceeds to operation 340.

Figure 6:
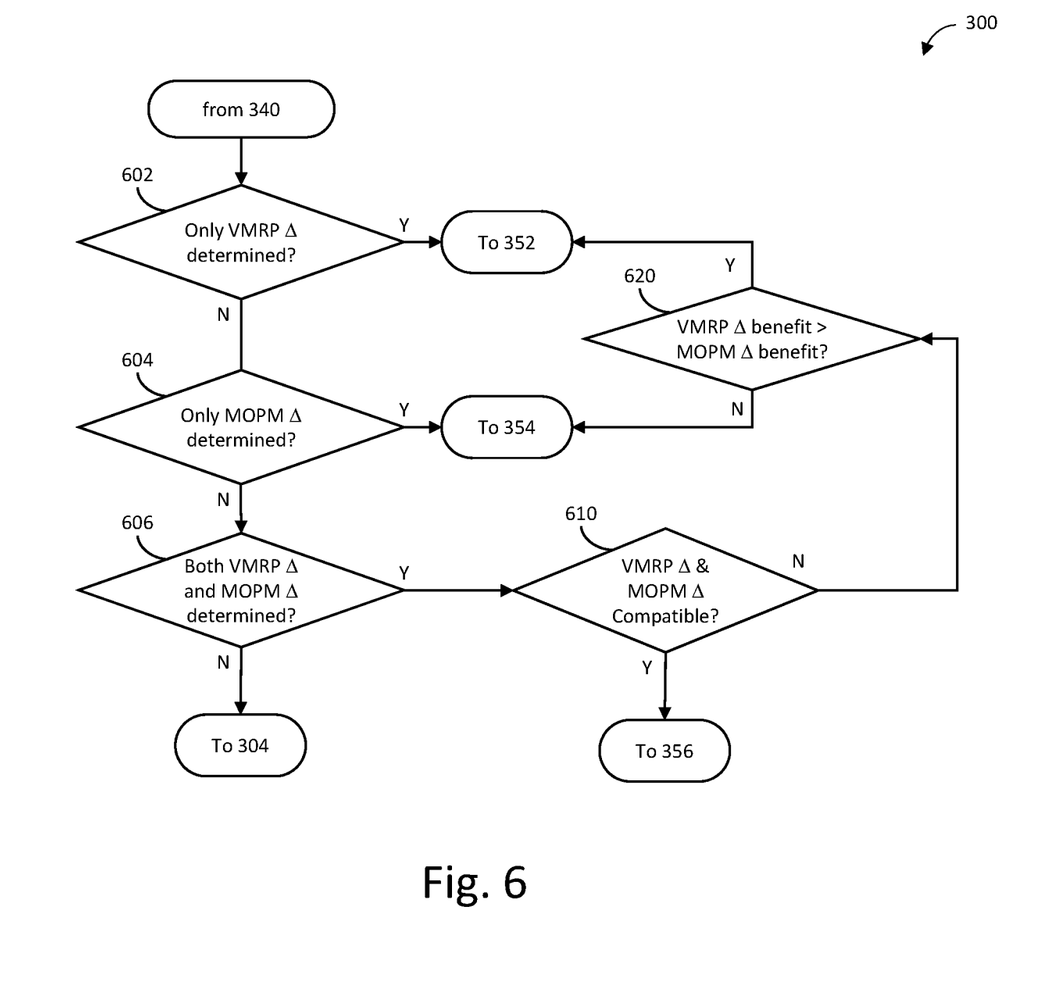
FIG. 6 is a flow diagram illustrating certain aspects of an example control process for a vehicle in a vehicle convoy.

Operation 340 initiates an arbitration of the VMRP Δ which may have been determined operation 322 and the MOPM Δ which may have been determined operation 332. As illustrated in FIG. 6, upon initiation of the arbitration by operation 340, process 300 proceeds to conditional 602 which evaluates whether only the VMRP Δ has been determined (e.g., the VMRP Δ was determined by operation 322 and the MOPM Δ was not determined by operation 332). If conditional 602 evaluates affirmative, process 300 proceeds to operation 352 which performs only the VMRP Δ and from operation 352 proceeds to operation 304. If conditional 602 evaluates negative, process 300 proceeds to conditional 604.

Conditional 604 evaluates whether only the MOPM Δ has been determined (e.g., the VMRP Δ was not determined by operation 322 and the MOPM Δ was determined by operation 332). If conditional 604 evaluates affirmative, process 300 proceeds to operation 354 which performs only the MOPM Δ and from operation 354 proceeds to operation 304. If conditional 604 evaluates negative, process 300 proceeds to conditional 606.

Conditional 606 evaluates whether both the VMRP Δ and the MOPM Δ have been determined (e.g., the VMRP Δ was determined by operation 322 and the MOPM Δ was determined by operation 332). If conditional 606 evaluates negative, process 300 proceeds to operation 304. If conditional 606 evaluates affirmative, process 300 proceeds to conditional 610.

Conditional 610 evaluates whether the VMRP Δ and the MOPM Δ are compatible (e.g., whether they can be performed in combination). The evaluating may consider, for example, whether the VMRP Δ and the MOPM Δ would result in any conflicting commands for or among powertrain systems or components. If conditional 610 evaluates affirmative, process 300 proceeds to operation 356 which performs the VMRP Δ and the MOPM Δ and from operation 356 proceeds to operation 304. If conditional 610 evaluates affirmative, process 300 proceeds to conditional 620.

Conditional 620 evaluates whether the benefit to operating efficiency of the vehicle of the VMRP Δ is greater than the benefit to operating efficiency of the MOPM Δ. The benefit to operating efficiency may be evaluated in terms of fuel consumption, fuel economy, or other energy consumption or efficiency objectives or metrics. The benefit to operating efficiency may also be considered in combination with other objectives including, for example, travel time, operating costs, or combinations of the foregoing or other operating objectives. The evaluation of whether the benefit to operating efficiency of the vehicle of the VMRP Δ is greater than the benefit to operating efficiency of the MOPM Δ may include estimating, modeling, or otherwise predicting an operating efficiency based on execution of the VMRP Δ and execution of the MOPM Δ.

If conditional 620 evaluates affirmative, process 300 proceeds to operation 352 which performs only the VMRP Δ and from operation 352 proceeds to operation 304. If conditional 620 evaluates negative, process 300 proceeds to operation 354 which performs only the MOPM Δ and from operation 354 proceeds to operation 304.

It shall be appreciated at process 300 is one example of a process including arbitrating among a plurality of control options including at least: (a) preforming a first modification of the VMRP determined to provide operation of the vehicle satisfying the minimum following distance and controlling motion of the vehicle using the first modification of the VMRP, (b) performing a second modification of the VMRP determined to provide improved operating efficiency of the vehicle controlling motion of the vehicle using the second modification of the VMRP, and (c) performing no modification of the VMRP and controlling motion of the vehicle using the VMRP without modification.

In the context of process 300, preforming the first modification of the VMRP may occur in connection with operation 316 in response to conditional 310 evaluating affirmative. In other embodiments the preforming the first modification of the VMRP may occur in connection with other evaluations and operations.

Also in the context of process 300, preforming the second modification of the VMRP may occur in connection with operation 352 in response to conditional 602 evaluating affirmative or in response to conditional 620 evaluating affirmative or may occur in connection with operation 356 in response to conditional 610 evaluating affirmative. In other embodiments the preforming the second modification of the VMRP may occur in connection with other evaluations and operations.

Further in the context of process 300, preforming no modification of the VMRP may occur in connection operation 354 in response to conditional 602 evaluating negative or in response to conditional 620 evaluating negative or may occur in response to conditional 606 evaluating negative. In other embodiments the preforming the no modification of the VMRP may occur in connection with other evaluations and operations.

A number of example embodiment according to the present disclosure shall now be further elucidated. A first example embodiment is a process of controlling a vehicle in a convoy of vehicles, the process comprising: operating an electronic control system (ECS) of the vehicle to perform the operations of: determining a vehicle motion reference parameter (VMRP) in response to a convoying control input (CCI), the VMRP being useable by the ECS to control motion of the vehicle; determining a braking capability of the vehicle, the braking capability including at least a regenerative braking capability; determining a minimum following distance between the vehicle and a forward vehicle of the convoy based at least in part upon the braking capability; and arbitrating among a plurality of control options including at least: (a) preforming a first modification of the VMRP determined to provide operation of the vehicle satisfying the minimum following distance and controlling motion of the vehicle using the first modification of the VMRP, (b) performing a second modification of the VMRP determined to provide improved operating efficiency of the vehicle controlling motion of the vehicle using the second modification of the VMRP, and (c) performing no modification of the VMRP and controlling motion of the vehicle using the VMRP without modification.

A second example embodiment includes the features of the first example embodiment, wherein the braking capability is variable based at least in part upon a battery state parameter and a battery state limit, and the arbitrating comprises: evaluating an effect of the VMRP on a following distance between the vehicle and the forward vehicle; and in response to the evaluating indicating that the following distance is less than a minimum following distance, arbitrating among (i) controlling motion of the vehicle using the first modification of the VMRP, and (ii) controlling motion of the vehicle using the first modification of the VMRP and using a modification of the battery state limit determined to increase a proportion of the braking capability attributable to regenerative braking.

A third example embodiment includes the features of the first example embodiment, wherein the arbitrating comprises: evaluating an operating efficiency benefit of at least one of the second modification of the VMRP and a modification of operation of the prime mover (MOPM); and arbitrating among (i) controlling motion of the vehicle using the second modification of the VMRP and not using the MOPM, (ii) controlling motion of the vehicle using the MOPM and not using the second modification of the VMRP, and (iii) controlling motion of the vehicle using the second modification of the VMRP and using the MOPM.

A fourth example embodiment includes the features of the first example embodiment, wherein the evaluating the effect of the VMRP on the following distance comprises predicting the effect based on dynamics of the vehicle and dynamics of a forward vehicle.

A fifth example embodiment includes the features of the first example embodiment, wherein the VMRP comprises a target for at least one of acceleration of the vehicle, velocity of the vehicle, and position of the vehicle.

A sixth example embodiment includes the features of the first example embodiment, wherein the determining the braking capability of the vehicle comprises determining at least a service braking capability and a regenerative braking capability of the vehicle, wherein the braking capability is based at least in part upon the service brake capability and the regenerative braking capability.

A seventh example embodiment includes the features of the first example embodiment, wherein the battery state parameter comprises at least one of a battery state of charge and a battery temperature.

An eighth example embodiment includes the features of the first example embodiment, wherein the CCI comprises at least one of an on-vehicle sensor configured to sense conditions external to the vehicle, a communication received from one of another vehicle in the convoy, a communication received from a terrestrial source external to the vehicle, and a communication received from a satellite source external to the vehicle.

A ninth example embodiment is an apparatus for controlling a vehicle in a convoy of vehicles, the apparatus comprising: a non-transitory computer-readable memory medium configured with instructions executable by a computer to: determine a vehicle motion reference parameter (VMRP) in response to a convoying control input (CCI), the VMRP being executable to control motion of the vehicle; determine a braking capability of the vehicle, the braking capability including at least a regenerative braking capability; determine a minimum following distance between the vehicle and a forward vehicle of the convoy based at least in part upon the braking capability; and arbitrate among a plurality of control operations including at least: (a) a first modification of the VMRP determined to provide operation of the vehicle satisfying the minimum following distance and controlling motion of the vehicle using the first modification of the VMRP, (b) a second modification of the VMRP determined to provide improved operating efficiency of the vehicle controlling motion of the vehicle using the second modification of the VMRP, and (c) no modification of the VMRP and controlling motion of the vehicle using the VMRP without modification.

A tenth example embodiment includes the features of the ninth example embodiment, wherein the braking capability is variable based at least in part upon a battery state parameter and a battery state limit, and the instructions being executable to arbitrate comprises the instructions being executable to: evaluate an effect of the VMRP on a following distance between the vehicle and the forward vehicle; and if the following distance is less than a minimum following distance, arbitrate among (i) controlling motion of the vehicle using the first modification of the VMRP, and (ii) controlling motion of the vehicle using the first modification of the VMRP and using a modification of the battery state limit determined to increase a proportion of the braking capability attributable to regenerative braking.

An eleventh example embodiment includes the features of the ninth example embodiment, wherein the instructions being executable to arbitrate comprises the instructions being executable to: evaluate an operating efficiency benefit of at least one of the second modification of the VMRP and a modification of operation of the prime mover (MOPM); and arbitrate among (i) controlling motion of the vehicle using the second modification of the VMRP and not using the MOPM, (ii) controlling motion of the vehicle using the MOPM and not using the second modification of the VMRP, and (iii) controlling motion of the vehicle using the second modification of the VMRP and using the MOPM.

A twelfth example embodiment includes the features of the ninth example embodiment, wherein the instructions being executable to evaluate the effect of the VMRP on the following distance comprises the instructions being executable to predict the effect based on dynamics of the vehicle and dynamics of a forward vehicle.

A thirteenth example embodiment includes the features of the ninth example embodiment, wherein the VMRP comprises a target for at least one of acceleration of the vehicle, velocity of the vehicle, and position of the vehicle.

A fourteenth example embodiment includes the features of the ninth example embodiment, wherein the instructions being executable to determine the braking capability of the vehicle comprises the instructions being executable to determine at least a service braking capability and a regenerative braking capability of the vehicle, wherein the braking capability is based at least in part upon the service brake capability and the regenerative braking capability.

A fifteenth example embodiment includes the features of the ninth example embodiment, wherein the battery state parameter comprises at least one of a battery state of charge and a battery temperature.

A sixteenth example embodiment includes the features of the ninth example embodiment, wherein the CCI comprises at least one of an on-vehicle sensor configured to sense conditions external to the vehicle, a communication received from one of another vehicle in the convoy, a communication received from a terrestrial source external to the vehicle, and a communication received from a satellite source external to the vehicle.

A seventeenth example embodiment is a system for controlling a vehicle in a convoy of vehicles, the system comprising: an electronic control system (ECS) in operative communication with a telematics system and a prime mover of the vehicle and configured to: determine a vehicle motion reference parameter (VMRP) in response to a convoying control input (CCI), the VMRP being useable by the ECS to control motion of the vehicle; determine a braking capability of the vehicle, the braking capability including at least a regenerative braking capability; determine a minimum following distance between the vehicle and a forward vehicle of the convoy based at least in part upon the braking capability; and arbitrate among a plurality of control operations including at least: (a) a first modification of the VMRP determined to provide operation of the vehicle satisfying the minimum following distance and controlling motion of the vehicle using the first modification of the VMRP, (b) a second modification of the VMRP determined to provide improved operating efficiency of the vehicle controlling motion of the vehicle using the second modification of the VMRP, and (c) no modification of the VMRP and controlling motion of the vehicle using the VMRP without modification.

An eighteenth example embodiment includes the features of the seventeenth example embodiment, wherein the braking capability is variable based at least in part upon a battery state parameter and a battery state limit, and the ECS is configured to: evaluate an effect of the VMRP on a following distance between the vehicle and the forward vehicle; and if the following distance is less than a minimum following distance, arbitrate among (i) controlling motion of the vehicle using the first modification of the VMRP, and (ii) controlling motion of the vehicle using the first modification of the VMRP and using a modification of the battery state limit determined to increase a proportion of the braking capability attributable to regenerative braking.

A nineteenth example embodiment includes the features of the seventeenth example embodiment, wherein the ECS being configured to arbitrate comprises the ECS being configured to: evaluate an operating efficiency benefit of at least one of the second modification of the VMRP and a modification of operation of the prime mover (MOPM); and arbitrate among (i) controlling motion of the vehicle using the second modification of the VMRP and not using the MOPM, (ii) controlling motion of the vehicle using the MOPM and not using the second modification of the VMRP, and (iii) controlling motion of the vehicle using the second modification of the VMRP and using the MOPM.

A twentieth example embodiment includes the features of the seventeenth example embodiment, wherein the ECS being configured to evaluate the effect of the VMRP on the following distance comprises the ECS being configured to predict the effect based on dynamics of the vehicle and dynamics of a forward vehicle.

A twenty-first example embodiment includes the features of the seventeenth example embodiment, wherein the VMRP comprises a target for at least one of acceleration of the vehicle, velocity of the vehicle, and position of the vehicle.

A twenty-second example embodiment includes the features of the seventeenth example embodiment, wherein the ECS being configured to determine the braking capability of the vehicle comprises the ECS being configured to determine at least a service braking capability and a regenerative braking capability of the vehicle, wherein the braking capability is based at least in part upon the service brake capability and the regenerative braking capability.

A twenty-third example embodiment includes the features of the seventeenth example embodiment, wherein the battery state parameter comprises at least one of a battery state of charge and a battery temperature.

A twenty-fourth example embodiment includes the features of the seventeenth example embodiment, wherein the CCI comprises at least one of an on-vehicle sensor configured to sense conditions external to the vehicle, a communication received from one of another vehicle in the convoy, a communication received from a terrestrial source external to the vehicle, and a communication received from a satellite source external to the vehicle.

It shall be appreciated that terms such as "a non-transitory computer-readable memory," "a non-transitory computer-readable memory medium," and "a non-transitory computer-readable memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While illustrative embodiments of the disclosure have been illustrated and described in detail in the drawings and foregoing description, the same is to be considered as illustrative and not restrictive in character, it being understood that only certain illustrative embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A process of controlling a vehicle in a convoy of vehicles, the process comprising:
    operating an electronic control system (ECS) of the vehicle to perform the operations of:
    determining a vehicle motion reference parameter (VMRP) in response to a convoying control input (CCI), the VMRP being useable by the ECS to control motion of the vehicle;
    determining a braking capability of the vehicle, the braking capability including at least a regenerative braking capability;
    determining a minimum following distance between the vehicle and a forward vehicle of the convoy based at least in part upon the braking capability; and
    arbitrating among a plurality of control options including at least:
    (a) performing a first modification of the VMRP determined to provide operation of the vehicle satisfying the minimum following distance and controlling motion of the vehicle using the first modification of the VMRP,
    (b) performing a second modification of the VMRP determined to provide improved operating efficiency of the vehicle controlling motion of the vehicle using the second modification of the VMRP, and
    (c) controlling motion of the vehicle using the VMRP without modification.

2. The process of claim 1, wherein the braking capability is variable based at least in part upon a battery state parameter and a battery state limit, and the arbitrating comprises:
    evaluating an effect of the VMRP on a following distance between the vehicle and the forward vehicle; and
    in response to the evaluating indicating that the following distance is less than a minimum following distance, arbitrating among (i) controlling motion of the vehicle using the first modification of the VMRP, and (ii) controlling motion of the vehicle using the first modification of the VMRP and using a modification of the battery state limit determined to increase a proportion of the braking capability attributable to regenerative braking.

3. The process of claim 1, wherein the arbitrating comprises:
    evaluating an operating efficiency benefit of at least one of the second modification of the VMRP and a modification of operation of the prime mover (MOPM); and
    arbitrating among (i) controlling motion of the vehicle using the second modification of the VMRP and not using the MOPM, (ii) controlling motion of the vehicle using the MOPM and not using the second modification of the VMRP, and (iii) controlling motion of the vehicle using the second modification of the VMRP and using the MOPM.

4. The process of claim 1, wherein the evaluating the effect of the VMRP on the following distance comprises predicting the effect based on dynamics of the vehicle and dynamics of a forward vehicle.

5. The process of claim 1, wherein the VMRP comprises a target for at least one of acceleration of the vehicle, velocity of the vehicle, and position of the vehicle.

6. The process of claim 1, wherein the determining the braking capability of the vehicle comprises determining at least a service braking capability and a regenerative braking capability of the vehicle, wherein the braking capability is based at least in part upon the service brake capability and the regenerative braking capability.

7. The process of claim 1, wherein the battery state parameter comprises at least one of a battery state of charge and a battery temperature.

8. The process of claim 1, wherein the CCI comprises at least one of an on-vehicle sensor configured to sense conditions external to the vehicle, a communication received from one of another vehicle in the convoy, a communication received from a terrestrial source external to the vehicle, and a communication received from a satellite source external to the vehicle.

9. An apparatus for controlling a vehicle in a convoy of vehicles, the apparatus comprising:
a non-transitory computer-readable memory medium configured with instructions executable by a computer to:
determine a vehicle motion reference parameter (VMRP) in response to a convoying control input (CCI), the VMRP being executable to control motion of the vehicle;
determine a braking capability of the vehicle, the braking capability including at least a regenerative braking capability;
determine a minimum following distance between the vehicle and a forward vehicle of the convoy based at least in part upon the braking capability; and
arbitrate among a plurality of control operations including at least:
(a) a first modification of the VMRP determined to provide operation of the vehicle satisfying the minimum following distance and controlling motion of the vehicle using the first modification of the VMRP,
(b) a second modification of the VMRP determined to provide improved operating efficiency of the vehicle controlling motion of the vehicle using the second modification of the VMRP, and
(c) controlling motion of the vehicle using the VMRP without modification.

10. The apparatus of claim 9, wherein the braking capability is variable based at least in part upon a battery state parameter and a battery state limit, and the instructions being executable to arbitrate comprises the instructions being executable to:
evaluate an effect of the VMRP on a following distance between the vehicle and the forward vehicle; and
if the following distance is less than a minimum following distance, arbitrate among (i) controlling motion of the vehicle using the first modification of the VMRP, and (ii) controlling motion of the vehicle using the first modification of the VMRP and using a modification of the battery state limit determined to increase a proportion of the braking capability attributable to regenerative braking.

11. The apparatus of claim 9, wherein the instructions being executable to arbitrate comprises the instructions being executable to:
evaluate an operating efficiency benefit of at least one of the second modification of the VMRP and a modification of operation of the prime mover (MOPM); and
arbitrate among (i) controlling motion of the vehicle using the second modification of the VMRP and not using the MOPM, (ii) controlling motion of the vehicle using the MOPM and not using the second modification of the VMRP, and (iii) controlling motion of the vehicle using the second modification of the VMRP and using the MOPM.

12. The apparatus of claim 9, wherein the instructions being executable to evaluate the effect of the VMRP on the following distance comprises the instructions being executable to predict the effect based on dynamics of the vehicle and dynamics of a forward vehicle.

13. The apparatus of claim 9, wherein the VMRP comprises a target for at least one of acceleration of the vehicle, velocity of the vehicle, and position of the vehicle.

14. The apparatus of claim 9, wherein the instructions being executable to determine the braking capability of the vehicle comprises the instructions being executable to determine at least a service braking capability and a regenerative braking capability of the vehicle, wherein the braking capability is based at least in part upon the service brake capability and the regenerative braking capability.

15. The apparatus of claim 9, wherein the battery state parameter comprises at least one of a battery state of charge and a battery temperature.

16. The apparatus of claim 9, wherein the CCI comprises at least one of an on-vehicle sensor configured to sense conditions external to the vehicle, a communication received from one of another vehicle in the convoy, a communication received from a terrestrial source external to the vehicle, and a communication received from a satellite source external to the vehicle.

17. A system for controlling a vehicle in a convoy of vehicles, the system comprising:
an electronic control system (ECS) in operative communication with a telematics system and a prime mover of the vehicle and configured to:
determine a vehicle motion reference parameter (VMRP) in response to a convoying control input (CCI), the VMRP being useable by the ECS to control motion of the vehicle;
determine a braking capability of the vehicle, the braking capability including at least a regenerative braking capability;
determine a minimum following distance between the vehicle and a forward vehicle of the convoy based at least in part upon the braking capability; and
arbitrate among a plurality of control operations including at least:
(a) a first modification of the VMRP determined to provide operation of the vehicle satisfying the minimum following distance and controlling motion of the vehicle using the first modification of the VMRP,
(b) a second modification of the VMRP determined to provide improved operating efficiency of the vehicle controlling motion of the vehicle using the second modification of the VMRP, and
(c) controlling motion of the vehicle using the VMRP without modification.

18. The system of claim 17, wherein the braking capability is variable based at least in part upon a battery state parameter and a battery state limit, and the ECS is configured to:
evaluate an effect of the VMRP on a following distance between the vehicle and the forward vehicle; and
if the following distance is less than a minimum following distance, arbitrate among (i) controlling motion of the vehicle using the first modification of the VMRP, and (ii) controlling motion of the vehicle using the first modification of the VMRP and using a modification of the battery state limit determined to increase a proportion of the braking capability attributable to regenerative braking.

19. The system of claim 17, wherein the ECS being configured to arbitrate comprises the ECS being configured to:
  evaluate an operating efficiency benefit of at least one of the second modification of the VMRP and a modification of operation of the prime mover (MOPM); and
  arbitrate among (i) controlling motion of the vehicle using the second modification of the VMRP and not using the MOPM, (ii) controlling motion of the vehicle using the MOPM and not using the second modification of the VMRP, and (iii) controlling motion of the vehicle using the second modification of the VMRP and using the MOPM.

20. The system of claim 17, wherein the ECS being configured to evaluate the effect of the VMRP on the following distance comprises the ECS being configured to predict the effect based on dynamics of the vehicle and dynamics of a forward vehicle.

21. The system of claim 17, wherein the VMRP comprises a target for at least one of acceleration of the vehicle, velocity of the vehicle, and position of the vehicle.

22. The system of claim 17, wherein the ECS being configured to determine the braking capability of the vehicle comprises the ECS being configured to determine at least a service braking capability and a regenerative braking capability of the vehicle, wherein the braking capability is based at least in part upon the service brake capability and the regenerative braking capability.

23. The system of claim 17, wherein the battery state parameter comprises at least one of a battery state of charge and a battery temperature.

24. The system of claim 17, wherein the CCI comprises at least one of an on-vehicle sensor configured to sense conditions external to the vehicle, a communication received from one of another vehicle in the convoy, a communication received from a terrestrial source external to the vehicle, and a communication received from a satellite source external to the vehicle.

* * * * *